(12) United States Patent
Enghardt et al.

(10) Patent No.: US 9,169,404 B2
(45) Date of Patent: Oct. 27, 2015

(54) PROCESS FOR REMOVING PAINT OVERSPRAY FROM A PAINT SPRAY BOOTH

(75) Inventors: Reimar Enghardt, Bad Oeynhausen (DE); Dietmar Kascha, Eschborn (DE); Frank Scharrenbach, Heidelberg (DE)

(73) Assignee: PPG Industries Ohio, Inc., Cleveland, OH (US)

( * ) Notice: Subject to any disclaimer, the term of this patent is extended or adjusted under 35 U.S.C. 154(b) by 295 days.

(21) Appl. No.: 13/583,071

(22) PCT Filed: Mar. 2, 2011

(86) PCT No.: PCT/EP2011/001009
§ 371 (c)(1),
(2), (4) Date: Nov. 26, 2012

(87) PCT Pub. No.: WO2011/110302
PCT Pub. Date: Sep. 15, 2011

(65) Prior Publication Data
US 2013/0064983 A1 Mar. 14, 2013

(30) Foreign Application Priority Data
Mar. 10, 2010 (EP) .................................... 10002493

(51) Int. Cl.
| | | |
|---|---|---|
| *B03C 3/00* | (2006.01) | |
| *B05D 1/02* | (2006.01) | |
| *C09K 3/00* | (2006.01) | |
| *C09D 7/00* | (2006.01) | |
| B05B 15/12 | (2006.01) | |
| C02F 1/24 | (2006.01) | |
| C02F 1/48 | (2006.01) | |
| C02F 103/14 | (2006.01) | |

(52) U.S. Cl.
CPC ............. *C09D 7/008* (2013.01); *B05B 15/1266* (2013.01); *C02F 1/24* (2013.01); *C02F 1/48* (2013.01); *C02F 2103/14* (2013.01)

(58) Field of Classification Search
CPC ... B05B 15/1266; C02F 1/24; C02F 2103/14; C02F 1/48; C09D 7/008
USPC ............. 134/10, 12, 38; 95/149, 57; 252/372, 252/364, 366; 427/421.1
See application file for complete search history.

(56) References Cited

U.S. PATENT DOCUMENTS

| | | | | |
|---|---|---|---|---|
| 4,748,049 | A | * | 5/1988 | Charles et al. ................ 427/156 |
| 5,098,450 | A | * | 3/1992 | Patzelt et al. .................... 95/154 |
| 5,201,946 | A | * | 4/1993 | Marsek ..................... 106/205.72 |
| 5,308,647 | A | * | 5/1994 | Lappi ............................ 427/154 |
| 5,334,255 | A | | 8/1994 | James et al. |
| 5,420,015 | A | * | 5/1995 | Wuerch ........................... 435/12 |
| 6,136,220 | A | * | 10/2000 | Agree et al. .................. 252/180 |
| 2002/0017223 | A1 | * | 2/2002 | Summerfield ................ 106/620 |
| 2002/0174949 | A1 | * | 11/2002 | Van Tyle ....................... 156/344 |
| 2011/0226127 | A1 | * | 9/2011 | Dingler et al. ..................... 95/71 |
| 2012/0149616 | A1 | * | 6/2012 | Schmid-Amelunxen et al. ............................. 508/161 |
| 2012/0177818 | A1 | * | 7/2012 | Trivedi et al. ................. 427/154 |

FOREIGN PATENT DOCUMENTS

| | | |
|---|---|---|
| GB | 2001258 | 1/1979 |
| RU | 2128088 C1 | 3/1999 |
| RU | 2161074 C1 | 12/2000 |
| SU | 1316712 A1 | 6/1987 |
| WO | WO 2008/067880 A2 | 6/2008 |
| WO | 2010025810 | 3/2010 |

* cited by examiner

*Primary Examiner* — Joseph D Anthony
(74) *Attorney, Agent, or Firm* — Charles M. Yeomans; Alan G. Towner

(57) ABSTRACT

The present invention relates to a specific aqueous separation liquid and to a process for removing paint overspray from a paint spray booth comprising: i) directing a gas stream through a paint spray booth; ii) contacting paint overspray with the gas stream flowing through the paint booth thereby forming a paint loaded gas stream containing paint particles or droplets dispersed therein, iii) forming a flowing substantially continuous liquid film of the aqueous separation liquid on a surface positioned within the flow path of the gas stream; iv) directing the paint loaded gas stream to said surface, in order to bring the gas stream in contact with the flowing substantially continuous film of the aqueous separation liquid, thereby transferring paint particles or droplets from the gas stream into the separation liquid to form a first paint loaded separation liquid; and v) removing the first paint loaded separation liquid and the gas stream having a reduced paint load.

11 Claims, No Drawings

PROCESS FOR REMOVING PAINT OVERSPRAY FROM A PAINT SPRAY BOOTH

The present invention relates to a process for removing paint overspray from a paint spray booth, to a method for painting a substrate utilizing the process for removing paint overspray from a paint spray booth and an aqueous separation liquid that is suitable for the process of removing paint overspray from a paint spray booth.

BACKGROUND OF THE INVENTION

At least since the seventies processes for removing paint overspray from paint spray booths are known wherein the paint is collected in liquid streams that are continuously flowing on baffle structures. U.S. Pat. No. 3,932,151 discloses a paint spray booth for removing excess atomized paint from the air in the vicinity of a spray paint operation comprising a spray booth structure having a working or spray painting area, an exhaust chamber and an exhaust stack which together define an air passage having an inlet at the spray painting area and an outlet at the stack, within which a fan is mounted for drawing air through the inlet and out the outlet at high velocity. A plurality of generally vertical baffles are disposed in the passage between the spray painting area and the exhaust chamber for the purpose of removing overspray or excess atomized paint from the air before it is exhausted from the stack. Mineral oil is continuously flowed over the front surface of the baffles so as to entrain therein paint solids in the air stream, and the oil is received in a reservoir or holding tank wherein the paint solids are allowed to settle, and from which the oil is recirculated for downward flow over the baffles. According to the teaching of U.S. Pat. No. 3,932,151 mineral oil is essential for performing the process since the paint is not chemically modified by the oil and thus can be easily separated, and the mineral oil allows for high velocity airflow without stripping the oil from the baffles. Unexpectedly, no fire hazard or explosion hazard has been experienced with the system described in U.S. Pat. No. 3,932,151 since the paint components are incorporated into the non-flammable mineral oil.

A similar technology is known from GB-A 2 001 258 wherein also the use of oil is recommended since it is a suitable carrier that is able to completely wet the paint solids so that the paint can be recovered and reprocessed after the oil has been expressed therefrom. In the particular arrangement disclosed in GB-A 2 001 258 wherein the paint loaded gas stream is passed through a convex throat so that the gas medium and the washing liquid are accelerated with non-turbulent, unidirectional flow the washing medium may also be a mixture of water and water-miscible oil to benefit from the advantage of oil without incurring the expense attendant upon the use of oil alone. It is essential according to the teaching of GB-A-2 001 258 in order to use an aqueous system that still contains oil that rather large amounts of washing liquid are accelerated together with the gas stream in a convex throat. Thus, according to the teaching of GB-A 2 001 258 the paint loaded gas stream is contacted with a considerably large bulk volume of washing liquid that may contain water but then also has to be accelerated is together with the gas stream in a convex throat. In contrast thereto, according to the teaching of U.S. Pat. No. 3,932,151 for thin films on, for example, baffle surfaces mineral oil is essential.

In DE-A-25 51 251 a process for removing paint overspray from a spray booth is described wherein in the lower part of the spray booth two inclined plates are arranged in a V-shape type whereby both plates overlap to the extent that a slot is formed between the plates. Onto the plates a flowing film of washing liquid is applied and due to overlapping of the plates the washing liquid flows from one plate to the other creating a curtain of washing liquid which covers the gap between both plates so that the paint loaded gas stream has to flow through the curtain of washing liquid. DE-A-25 51 251 does not particularly specify the washing liquid. It is only mentioned that in case the paint contains organic solvents, like xylene and toluolene, or non-aqueous paints having aliphatic hydrocarbons as solvents are used then a denaturating agent comprising a basic compound and a polyalkylene glycol alkylmonoether is employed.

Furthermore, DE-A 43 38 003 discloses a process for the separation of organic components from air vents. According to the teaching of DE-A 43 38 003 an air vent stream comprising organic components is directed through two absorption stages wherein in the first absorption stage synthetic oils, for example, silicone oil, are used as gas washing liquid whereas in the second stage less expensive oils, like vegetable oils, can be employed. Specific examples of the synthetic oils used in the first absorption stage are silicone oil, phthalic acid dialkylesters and polyethylene glycol dialkylethers. But there is no disclosure of any kind of aqueous washing liquid.

Modern coating lines, especially in the automotive car industry, use spray booths with wet deposition of the overspray obtained. Water is sprayed to generate, within the spray booth, a finely divided water mist which takes up the paint constituents of the overspray and discharges them from the booth. The downstream water separators then collect the water loaded with paint constituents. Due to current legislation the spray booth water must be circulated. This requirement makes it necessary to incorporate treatment units for the circulating water wherein paint constituents and other contaminants are removed from the circulating water. A summary of currently used treatment systems for circulating water is given in WO 99/10284. Herein especially a method for treating circulation water from wet-wash spray booths is disclosed wherein the circulation water is passed through a reverse osmosis state. With this process a considerable reduction in energy consumption when treating the circulation water for wet-wash spray booths is achieved.

Nevertheless, due to the vast amounts of water to be circulated in an industrial coating line when using wet-wash spray booths the energy consumption of such lines and the investment costs are still very high.

WO 2008/067880 discloses a method and device for removing solids from overspray generated from painting objects. The overspray is taken up in an airstream and transported to a separating surface over which a water-free liquid with low vapor pressure at the working temperature, preferably less than 30 mbar, flows in which the solids from the overspray are taken up but not dissolved. A further requirement of the water-free liquid is that it does not react with the paint components. The paint solids are then removed from the spray booth with said liquid and separated from the liquid by sedimentation. In WO 2008/067880 it is considered essential to avoid water in the liquid for collecting the paint overspray. Suitable liquids are vegetable oils and glycol ethers.

In a press release by EISENMANN ANLAGEN BAU GMBH & CO KG, available under http://www.eisenmann.de/include/presse/Presseinformation ESCRUB.pdf, a new system for processing overspray in spray booths is disclosed. This system is a further development of the system disclosed in WO 2008/067880. According to the E-Scrub process an air stream flows substantially perpendicular to the moving direction of car bodies to be painted in down-flow mode thereby taking up the overspray that is not deposited on the car body during the spraying process. The loaded air stream is contacted below the spray booth level with inclined flood sheets that are wetted with a separating agent. The flood sheets or baffle plates are arranged in a V-shape manner without overlap. Upon contact of the paint loaded air stream with the separating agent flowing downwards the baffle plates the majority of the paint components are transferred from the air stream to the separating agent. The separating agent is collected in a pan and removed from the system. The separating agent is circulated after at least partial separation from the paint components. The air stream still loaded with paint particles is then directed to an electrostatic scrubber unit that is equipped with positively charged separating plates which are also wetted with the separating agent. High voltage wires are fitted inside the electrostatic scrubber. The paint particles in the air stream are negatively charged and attracted by the separating plates. The paint particles are taken up by the separating agent and removed with the down-flowing separating agent from the electrostatic scrubber system and are collected in the same pan as the main stream of separating agent. The press release does not contain any information with respect to the composition of the separating agent, with the exception that the separating agent promotes agglomeration of the paint particles. In the press release it is announced that the E-Scrub system allows a reduction of energy consumption in the order 78% compared to conventional wetwash spray booth technologies.

The object of the present invention is to provide an efficient process for removing paint overspray from a paint spray booth with low energy consumption with a high recycling ratio of all carrier streams used in the process that can be run for a prolonged time with high process stability. It is furthermore an object of the present invention to provide a suitable liquid carrier for collecting paint overspray in such process for removing paint overspray from a paint spray booth.

SUMMARY OF THE INVENTION

These objects have been attained by an aqueous separation liquid for collecting paint overspray from a gas stream comprising:
   a) at least 49.95 wt-% water, based on the total weight of the aqueous separation liquid;
   b) at least one non-ionic surfactant; and
   c) 5 to 50 wt.-% based on the total weight of the aqueous separation liquid of an organic water-soluble film-supporting component selected from monomeric polyols having at least three hydroxyl groups in the molecule and polymeric polyols selected from poly(ethylene glycols, polyester polyols, acrylic polyols and polyurethane polyols, whereby components b) and c) are different,
the aqueous separation liquid having a viscosity in terms of outflow time in the range of 11 s to 25 s, preferably 11 s to 20 s, more preferred 11 s to 15 s as measured according to DIN 53 211 using a 4 mm flow cup at 23° C.

A further aspect of the present invention is a process for removing overspray from a paint spray booth comprising:
   i) directing a gas stream through a paint spray booth;
   ii) contacting paint overspray with the gas stream flowing through the paint booth thereby forming a paint loaded gas stream containing paint particles or droplets dispersed therein,
   iii) forming a flowing substantially continuous liquid film of the above aqueous separation liquid on a surface positioned within the flow path of the gas stream;
   iv) directing the paint loaded gas stream to said surface, in order to bring the gas stream in contact with the flowing substantially continuous film of the aqueous separation liquid, thereby transferring paint particles or droplets from the gas stream into the separation liquid to form a first paint loaded separation liquid; and
   v) removing the first paint loaded separation liquid and the gas stream having a reduced paint load.

According to a preferred embodiment of the present invention the process further comprises:
   vi) at least partially separating the paint components from the first separation liquid to obtain a first purified separation liquid and/or
   vii) purifying the removed gas stream to obtain a purified gas stream; and
   viii) optionally at least partially recycling the first purified separation liquid to step iii) and/or at least partially recycling the purified gas stream to step i).

A still further aspect of the present invention is a method for painting a substrate is comprising:
   spraying a paint onto a substrate in a paint spray booth, thereby obtaining a painted substrate and paint overspray; and
   removing the paint overspray with the process.

DETAILED DESCRIPTION OF THE PRESENT INVENTION

One object as defined above is to provide a process for removing paint overspray from a paint spray both by means of low amounts of carrier liquid that has to be purified prior to recycling to the process. In order to achieve this goal a gas stream is used to take up the paint overspray when spraying a substrate in a spray booth. According to one embodiment a gas stream is directed through a paint spray booth in a downflow mode around the substrate to be painted with high velocity. Thereby it is ensured that the paint overspray is entrained in the gas stream to avoid fouling and contamination of the walls of the paint booth, and fast removal of paint overspray from the paint spray booth. The latter is especially important in automated high capacity lines wherein multiple substrates are sprayed with different colors to avoid contamination of the following substrate.

As carrier gas for the gas stream preferably air is used due to being available at low cost. Temperature and moisture content of the air stream are adjusted to achieve safe operation of the spraying booth and to obtain the desired paint quality. Thus, a key point for an energy efficient spraying process is to have the possibility to recycle the gas stream to make optimum use of a high volume gas stream adjusted to a certain temperature and moisture content range. A further advantage of recycling the gas carrier stream is, of course, to reduce overall pollution of the paint line, thus achieving a high recycling ratio of the gas stream of at least 60%, preferably at least 65%, more preferred at least 70%, at least 75%, at least 85%, most preferred at least 90%, at least 95%, at least 97%, or at least 99%.

Furthermore, it is important, especially for obtaining the desired high recycling rates of the gas carrier, to effectively remove paint overspray entrained in the gas stream.

According to one embodiment of the present invention the paint loaded gas stream leaving the spraying area of the paint spray booth is contacted with contact surfaces. In the above described embodiment with a downflow mode of the carrier gas stream through the paint booth these contact surfaces are positioned below the spraying area in the paint spray booth.

According to the present invention a flowing substantially continuous liquid film of an aqueous separation liquid is formed on these contact surfaces. These contact surfaces may be formed by two opposite baffle plates that cover together the whole width of the paint spray booth underneath the spraying level. These baffle plates are preferably inclined to provide a funnel type arrangement, thereby allowing flowing of the continuous film of separation liquid on the baffle plates by gravity. The paint loaded gas stream is contacted with the wetted surfaces and flows between the opposite plates forming the funnel. Thereby the gas stream is channeled and intense contact between the gas stream and the flowing film of separation liquid is ensured.

It is preferred that contrary to the teaching of the prior art as discussed above, the opposite plates forming the funnel do not overlap so that there is no curtain of separation fluid flowing from one plate to the other plate thereby creating a curtain that has to be penetrated by the gas stream. Such an arrangement is prawn to create turbulence which is contrary to the requirement of providing a flowing substantially continuous film, especially at very low film thicknesses that are desirable according to the present invention, as will be discussed below.

Upon contact between the paint loaded gas stream and the flowing continuous film of separation liquid paint components are taken up from the gas stream into the separation liquid.

According to the above discussed preferred embodiments at the bottom of the funnel formed by the inclined contact surfaces the paint loaded separation liquid is collected and removed from the system. The separation liquid is preferably further processed to at least partially separate paint components from the separation liquid so that the separation liquid can be recycled to the system. According to a preferred embodiment of the present invention separation of the paint components from the separation liquid can be achieved with flotation or sedimentation, whereby the separation liquid is preferably collected at the bottom of the system in a drain. The separation liquid is then directed to a structure where the required residence time for the selected separation method can be achieved. The drain itself can provide the required residence time for a flotation or sedimentation process.

Prior to recycling the separation liquid can be further purified prior to recycling in order to avoid build-up of unwanted products that are soluble in the separation liquid. This is preferably done in a partial side stream to keep those components at a constant level thereby avoiding energy consumption and costly complete treatment of the separation liquid.

According to the process of the present invention the majority of overspray entrained in the gas stream is transferred to the separation liquid. Preferably at least 50%, at least 55%, at least 60%, at least 65%, at least 70%, at least 75%, most preferred at least 80% of the overspray entrained in the gas stream is transferred to the separation liquid. Depending on the amount of paint overspray remaining in the gas stream and the intended use of the gas stream further purification of the gas stream, especially if the gas stream is to be recycled into the process, might be advantageous.

According to a preferred embodiment of the present invention the gas stream after contact with the separation liquid is directed through an electrostatic scrubber comprising charged plates. Particles or droplets dispersed in the gas stream are charged with the opposite charge of the charged plates and thus directed by the electrical field to the charged plates and removed from the gas stream. According to a preferred embodiment of the present invention a flowing substantially continuous film of the same aqueous separation liquid as discussed above, is formed on the charged plates. In the electrostatic scrubber the charged plates are preferably oriented in a vertical way with the result that the separation liquid flows vertically down the charged plates. The paint particles and droplets directed by the electrical field to the opposite charged plates will then collect on the flowing substantially continuous film of separating liquid and will thus be removed from the electrostatic scrubber. Due to the flow of continuous film always a fresh surface of separation liquid is available to receive the paint components. Due to the vertical arrangement of the charged plates a continuous film flows by gravity and can be easily collected below the electrostatic scrubber, for example, in a drain which might be the same drain as for the separation liquid wetting the contact surfaces, as discussed above. The separation liquid loaded with paint particles leaving the electrostatic scrubber may be further processed in the same way as the separation liquid for wetting the contact surfaces. Preferably the two separation liquid streams according to the present invention are combined and treated together for separation of paint particles, as discussed above. The thus purified aqueous separation liquid can be recycled to the contact surfaces and/or the charged plates of the electrostatic scrubber.

The present inventors have now discovered that in order to operate the above described process for removing paint overspray from a paint spray booth the separation liquid has to fulfill to some extent conflicting requirements.

As mentioned above, in order to operate a paint spray booth in a cost efficient way with low energy consumption process streams have to be recycled and reduced in volume. This has already been discussed above with respect to the gas stream.

But the same applies even more to the separation liquid. First of all, for cost reasons as well as for safety reasons, especially when used in connection with the preferred electrostatic scrubber, the separation liquid should be water-based and contain a minimum of, if possible no low volatile organic material, not desired from an emission point of view and not desired from a safety point of view since these components may form ignitable compositions, especially in combination with high voltage electrostatic scrubbing.

Furthermore, as mentioned above, the total amount of separation liquid to be processed should be as small as possible since this will directly influence the energy consumption of the system. Nevertheless, the separation liquid should possess the ability to collect effectively paint overspray from different sources, like water-based coating compositions or solvent-based coating compositions, thereby achieving wetting of considerably different paint systems in order to effectively collect paint overspray from a gas stream. Furthermore, when applied in a process as discussed above, it is essential that a flowing substantially continuous film on strongly inclined, even vertical surfaces is formed. This flow of a substantially continuous liquid film has to be maintained even if contacted with a high velocity gas stream containing even solid particles that impinge the flowing continuous film. Furthermore, when using the separation liquid in electrostatic scrubber systems the liquid should have a certain electrical conductivity and, of course, the flowing substantially continuous film needs to have a high uniformity since any changes in thickness of the film due to turbulence or distortion may tremendously affect the electrical field and may thus disturb the electrostatic scrubbing process.

On the other hand, the separation liquid has to be configurated in order to allow easy separation of the paint components from the separation liquid. For example, a separation liquid with a high viscosity might be helpful to create a flowing substantially continuous film but it is difficult then to obtain the desired film uniformity, and common cost effective separation methods, like flotation or sedimentation, are difficult to perform.

The inventors have now discovered that if the following criteria are fulfilled an optimum separation liquid for the process as described above is obtained. The viscosity in terms of outflow time should be in the range of between 11 and 25 s as measured according to DIN 53 211 using a 4 mm flow cup. DIN 53 211 discloses that the measuring standard is suitable for measuring viscosities of liquids showing an outflow time of at least 20 s. The inventors, nevertheless, used the DIN 53 211 standard for measuring the outflow time of the separation liquid of the present invention since this is the dominant standard for viscosity measurement in the paint industry in order to obtain comparable results. Furthermore, the inventors realized that in the range of 10 s to 20 s still a very high reproducibility can be achieved which confirms that contrary to the recommendation in DIN 53 211 also liquids having an outflow time between 10 s and 20 s can be measured using a 4 mm flow cup.

Such viscosity is sufficiently low to allow easy separation of paint components using standard technology, like flotation or sedimentation. Low viscosity of separation liquid will result in high flow velocities compared to a higher viscous material. High flow velocities, of course, result at the same thickness of the continuous film in an increased amount of separation liquid to be processed and it is more difficult to form a stable continuous film of uniform thickness that is not disturbed by the gas flow in contact with the continuous film of separation fluid according to the process of the present invention.

To counteract the negative effect of low viscosity material the film thickness has to be reduced in order to have at higher flow velocities still low amounts of separation fluid. Thus, it is preferred according to the process of the present invention to have film thicknesses of less than 50 μm, less than 45 μm, less than 40 μm, less than 35 μm, less than 30 μm, less than 25 μm, less than 23 μm, less than 21 μm, less than 20 μm, less than 18 μm, less than 17 μm, less than 16 μm, less than 15 μm. The minimum film thickness is preferably at least 5 μm, at least 6 μm, at least 7 μm, at least 8 μm, at least 9 μm or at least 10 μm.

Low film thickness of the separation liquid is especially important for the electrostatic scrubber to minimize the effect of the continuous film of separation liquid on the electrical field.

But having a film of a low viscous liquid at low thickness makes it even more difficult to achieve a stable flowing substantially continuous film that is essentially uniform, even if in contact with high velocity gas streams. Any disturbance, especially in a low viscous film of low thickness, for example, to the extent that either the contact surface below the spray area in the spray booth is no longer wetted may result in a situation that the paint loaded gas stream directly contacts the surface, leading to possible fouling of the contact surface whereby such fouling would make it virtually impossible to retain a continuous film on the contact surfaces. These detrimental effects are even more pronounced in the electrostatic scrubber unit since any fouling will tremendously affect the electrical field in the scrubber.

The present inventors have now surprisingly discovered that a low viscosity liquid can be used in the process of the present invention, even at the above described low film thicknesses, if good wettability of the surfaces to be contacted is achieved and the separation liquid contains an organic water-soluble film supporting component. The required wettability of the aqueous separation liquid according to the present invention is achieved by using non-ionic surfactants. Preferably, according to the present invention a surfactant system for achieving the wettability is to be selected that does not interact with the other components of the separation liquid or with the components of the paint overspray. Thus, the inventors have discovered that ionic surfactants, i.e. cationic or anionic or amphoteric surfactants, may interact with paint components to the extent that the required wettability is difficult to maintain throughout a prolonged time of running the process according to the present invention, especially if the separation liquid is recycled. Therefore, according to one embodiment of the present invention the separation liquid is free of ionic surfactants.

Preferred nonionic surfactants may be selected from poly(ethylene glycol) fatty alcohol ethers, alkylphenol poly(ethylene glycol) ethers, poly(ethylene glycol) fatty acid esters, fatty acid mono glycerides, poly(ethylene glycol) mono fatty acid esters, fatty acid mono alkanol amides, fatty acid dialkanol amides, ethoxylated fatty acid mono alkanol amides, ethoxylated fatty acid dialkanol amides, fatty acid partial esters of pentaerythritol, ethoxylated fatty acid partial esters of pentaerythritol, sorbitan fatty acid esters, ethoxylated sorbitan fatty acid esters, alkyl amino oxides, ethoxylated alkyl amino oxides, fluoro containg tensides, polysiloxane based tensides and combinations thereof.

Particularly preferred nonionic surfactants are poly(ethylene glycol) fatty alcohol ethers, poly(ethylene glycol) fatty acid esters, fluoro containg tensides and polysiloxane based tensides whereby poly(ethylene glycol) fatty alcohol ethers are particularly preferred. The amount and type of nonionic surfactants is adjusted in order to obtain the required wettability. The amount of nonionic surfactant present in the aqueous separation liquid according to the present invention may be 0.05 to 1.5% or 0.1 to 1.3%, or 0.5 to 1.0 wt-% based on the total weight of the liquid.

Furthermore, the inventors have surprisingly discovered that it is advantageous if the separation liquid when used to wet the charged plates of the electrostatic scrubber contains in addition an anionic surfactant. It was found that the presence of the anionic surfactant improves agglomeration of paint particles in the separation liquid and thus separation of paint sludge from the separation liquid. Without wanted to be bound by theory it is assumed that the paint particles are negatively charged in the electrostatic scrubber and the presence of anionic surfactants helps agglomeration of paint particles. Thus, the anionic surfactant may be added to the separation liquid prior to application to the charged plates of the electrostatic scrubber or may be added to the separation liquid as an agglomeration adjuvant to the separation liquid after it has left the electrostatic scrubber. Since it is preferred to recycle the purified separation liquid after separation of the paint particles to the paint spray booth and/or to the electrostatic scrubber care should be taken in case of a separation liquid containing anionic surfactants that the purified separation liquid is recycled to the scrubber only or if it is recycled to the paint spray booth wherein it is not preferred that the separation liquid contains anionic surfactants to take known measures for charge neutralization prior to recycling to the paint spray booth.

Suitable anionic surfactants may be selected from fatty alcohol sulfates, alkane sulfonates, alkyl benzene sulfonates, sulfosuccinates such as sodium dialkyl sulfosuccinate, ethoxylated fatty alcohol sulfates, fatty alcohol ether phosphates, ethoxylated fatty alcohol ether phosphates, monoglyceride sulfates. Particularly suitable are sulfosuccinates especially the sodium salt of di(ethylhexyl) sulfo succinic acid.

The amount of anionic surfactant present in the aqueous separation liquid according to the present invention may be 0.05 to 2.5% or 0.1 to 2.0%, or 0.5 to 1.5 wt-% based on the total weight of the liquid.

The organic water soluble film supporting component to be used according to the present invention is preferably an organic compound having a vapor pressure at 20° C. of less than 1 Pas, preferably less than 0.5 Pas, and most preferred less than 0.1 Pas. The organic water soluble film supporting component of the separation liquid according to the present invention is selected from monomeric polyols having at least three hydroxyl groups in the molecule and polymeric polyols selected from poly(ethylene glycols), polyester polyols, acrylic polyols and polyurethane polyols, preferably the organic water-soluble film supporting component is selected from glycerol and poly(ethylene glycols).

The present inventors have also discovered that monoalkylethers of poly(ethylene glycols), poly(propylene glycols) or mixed poly((ethylene)(propylene) glycols) are less effective. Thus the aqueous separation liquid does preferably not contain such monoalkylether terminated glycols, poly(propylene glycols) or mixed poly((ethylene)(propylene) glycols).

The polymeric polyols to be preferably used as organic water soluble film supporting component in the separation liquid according to the present invention have preferably a number average molecular weight in the range of 200 to 3,000, or 200 to 2,000, or 300 to 1,500, or 300 to 1000. The amount of the organic water soluble film supporting component in the aqueous separation liquid according to the present invention depends on the specific compound selected and the other components of the separation liquid and can thus be varied in the range of 5 to 50 wt.-% based on the total weight of the liquid. A preferred amount of organic water soluble film supporting component is 7 to 40 wt.-%, 10 to 35 wt.-%, 12 to 30 wt.-%, or 15 to 25 wt.-% based on the total weight of the liquid.

If necessary, the viscosity of the aqueous separation liquid according to the present invention can be adjusted by adding a rheology modifier. Suitable rheology modifiers that are different from the components b) (non-ionic surfactant) and c) (organic water-soluble film-supporting component) are selected from cellulose derivatives, polysaccharides, starch and starch derivatives, polyvinyl alcohol and polyvinyl pyrrolidone.

According to the present invention those rheology modifiers are particularly preferred that have a low and if possible neglectable interaction with paint components in order to assure that the viscosity of the separation liquid does not substantially change. Polyvinyl alcohol and particularly cellulose derivatives are, therefore, most preferred.

Depending on the paint system sprayed in the spray booth the aqueous separation liquid according to the present invention may additionally contain paint detackifyer and/or agglomeration agents that are preferably selected from polyamines, polyamide amines, silicates, aluminum compounds, aluminum silicates, and combinations thereof. Suitable anionic agglomeration agents are polycarboxylates. Particularly suitable anionic agglomeration agents are sodium salts of polyaspartic acid.

The process of the present invention and the aqueous separation liquid to be used in the process of the present invention is suitable for a highly automated continuous or semicontinuous process for spraying any kind of substrates whereby the carrier components for removing paint overspray, especially the gas stream as well as the aqueous separation liquid can be effectively recycled and low amounts of aqueous separation liquid are only necessary to achieve the required removal of paint overspray from a spray booth. Thus, the process, the method and the aqueous separation liquid are particularly suitable for high capacity coating lines, especially those used by the automotive industry. But the processes of the present invention, as well as the aqueous separation liquid might also be used in processes for painting other substrates, like in the furniture or household appliance industry, or for other industrial painting operations.

The present invention will now be explained in more detail with reference to the following Examples.

Following aqueous separation liquids were prepared by combining the components according to Table 1. The amounts in the table are given as 100% solid.

TABLE 1

| Component | Example 1 (wt-%) | Comp. Example 1 (wt.-%) | Comp. Example 2 (wt.-%) |
|---|---|---|---|
| rheology modifier | Tylose[1] 0.375 | Tylose[1] 0.375 | Tylose[1] 0.375 |
| film supporting component | glycerol 12.5 | glycerol 4.0 | PPG 425[2] 12.5 |
| detackifyer | polyamine 5 | polyamine 5 | polyamine 5 |
| non-ionic surfactant | Propetal 105[3] 0.2 | Propetal 105[3] 0.2 | Propetal 105[3] 0.2 |
| water | 81.925 | 90.425 | 81.925 |
| viscosity @ 23° C. DIN 53 211 4 mm flow cup | 14 sec | 13 sec | 15 sec |

[1]cellulose ether available from SE Tylose GmbH & Co. KG
[2]polypropylene glycol having a molecular weight of 425
[3]surfactant available from Zschimmer & Schwarz GmbH & Co. KG The aqueous separation liquids according to example 1 and comparative examples 1 and 2 were evaluated for film formation and film quality upon application to inclined stainless steel plates. The liquids of examples 1 and comparative example 2 form a stable free-flowing homogenous smooth film without visible distortions on the steel plates. The liquid of comparative example 1 forms a free-flowing film that exhibits visible distortions like grooves and droplet formation.

In a second experiment the separation liquids according to example 1 and comparative examples 1 and 2 were mixed with a commercial 2K clear coating composition available from PPG and the separation liquids were evaluated for paint separation. In the separation liquids of example 1 and comparative example 1 the paint agglomerates and can be easily removed by flotation, whereas the paint is soluble in the separation liquid of comparative example 2.

The invention claimed is:

1. An aqueous separation liquid for collecting paint overspray from a gas stream comprising:
    a) at least 49.95 weight percent water, based on the total weight of the aqueous separation liquid;
    b) at least one non-ionic surfactant; and
    c) 5 to 50 weight percent based on the total weight of the aqueous separation liquid of an organic water-soluble film-supporting component comprising monomeric polyols having at least three hydroxyl groups in the molecule and polymeric polyols comprising poly(ethylene glycols), polyester polyols, acrylic polyols and polyurethane polyols, whereby
    components b) and c) are different,
    the aqueous separation liquid having a viscosity in terms of outflow time in the range of 11s to 25s as measured according to DIN 53 211 using a 4 mm flow cup at 23° C.

2. The aqueous separation liquid according to claim 1, further comprising at least one anionic surfactant.

3. The aqueous separation liquid according to claim 1, wherein the non-ionic surfactant comprises poly(ethylene glycol) fatty alcohol ethers, alkylphenol poly(ethylene glycol) ethers, poly(ethylene glycol) fatty acid esters, fatty acid mono glycerides, poly(ethylene glycol) mono fatty acid esters, fatty acid mono alkanol amides, fatty acid dialkanol amides, ethoxylated fatty acid mono alkanol amides, ethoxylated fatty acid dialkanol amides, fatty acid partial esters of pentaerythritol, ethoxylated fatty acid partial esters of pentaerythritol, sorbitan fatty acid esters, ethoxylated sorbitan fatty acid esters, alkyl amino oxides, ethoxylated alkyl amino oxides, fluoro containing tensides, polysiloxane based tensides or combinations thereof.

4. The aqueous separation liquid according to claim 1, wherein the non-ionic surfactant(s) is present in an amount of 0.05 to 1.5 weight percent, based on the total weight of the liquid.

5. The aqueous separation liquid according to claim 1, wherein the organic water-soluble film supporting component comprises a monomeric polyol having at least three hydroxyl groups in the molecule.

6. The aqueous separation liquid according to claim 1, wherein the polymeric polyols have a number average molecular weight in the range of 200 to 3,000.

7. The aqueous separation liquid according to claim 1, wherein the organic water-soluble film supporting component is present in an amount of 7 to 40 weight percent, based on the total weight of the liquid.

8. The aqueous separation liquid according to claim 1, wherein the aqueous separation liquid further comprises:
   d) a rheology modifier being different from components b) and c) comprising cellulose derivatives, polysaccharides, starch and starch derivatives, polyvinyl alcohol, or polyvinyl pyrrolidone.

9. The aqueous separation liquid according to any claim 1, wherein the liquid further comprises:
   e) a paint detackifying and/or agglomeration agent comprising polyamines, polyamide amines, silicates, aluminum compounds, aluminum silicates, sodium salts of polyaspartic acid or combinations thereof.

10. The aqueous separation liquid of claim 5, wherein the monomeric polyol comprises glycerol.

11. A process for removing paint overspray from a paint spray booth comprising:
   i) directing a gas stream through the paint spray booth;
   ii) contacting paint overspray with the gas stream flowing through the paint booth thereby forming a paint loaded gas stream containing paint particles or droplets dispersed therein,
   iii) forming a flowing substantially continuous liquid film of the aqueous separation liquid according to claim 1 on a surface positioned within the flow path of the gas stream;
   iv) directing the paint loaded gas stream to said surface, in order to bring the gas stream in contact with the flowing substantially continuous film of the aqueous separation liquid, thereby transferring paint particles or droplets from the gas stream into the aqueous separation liquid to form a first paint loaded separation liquid; and
   v) removing the first paint loaded separation liquid from said surface, resulting in the gas stream having a reduced paint load.

* * * * *